United States Patent [19]

Ugo

[11] 4,081,271
[45] Mar. 28, 1978

[54] PROCESS FOR SEPARATING AND RECOVERING RHODIUM AND IRIDIUM FROM THEIR MIXTURES WITH OTHER PRECIOUS METALS

[75] Inventor: Renato Ugo, Cinisello Balsamo (Milan), Italy

[73] Assignee: PROTEC Process e Tecnologie S.p.A., Milan, Italy

[21] Appl. No.: 780,103

[22] Filed: Mar. 22, 1977

Related U.S. Application Data

[63] Continuation of Ser. No. 666,429, Mar. 12, 1976, abandoned.

[30] Foreign Application Priority Data

Mar. 27, 1975 Italy .................................. 21715/75

[51] Int. Cl.$^2$ ............................................ C22B 11/04
[52] U.S. Cl. .................................. 75/108; 75/118 R; 75/121
[58] Field of Search ........................ 75/108, 121, .5 A; 423/22

[56] References Cited

U.S. PATENT DOCUMENTS

| 3,457,116 | 7/1969 | Arcano et al. ...................... 75/108 X |
| 3,887,489 | 6/1975 | Fannin et al. ........................... 423/22 |

*Primary Examiner*—G. Ozaki
*Attorney, Agent, or Firm*—Stevens, Davis, Miller & Mosher

[57] ABSTRACT

Process for separating and recovering rhodium and/or iridium from the other precious metals (Pd, Pt, Ru, Os, Au, Ag), according to which a solution containing the precious metals in any form is treated for a time between 15 minutes and 10 hours with carbon monoxide in the presence of a quantity of water or primary or secondary alcohols at least equal in weight to the total quantity of precious metals present, the crystalline precipitate which forms, and which contains all the noble metals except Rh and Ir in a state of high purity is separated and the Rh and/or Ir are recovered practically totally from the solution.

6 Claims, No Drawings

PROCESS FOR SEPARATING AND RECOVERING RHODIUM AND IRIDIUM FROM THEIR MIXTURES WITH OTHER PRECIOUS METALS

This is a continuation of application Ser. No. 666,429 filed Mar. 12, 1976 now abandoned.

This invention relates to a process for separating rhodium and/or iridium from one or more of the remaining precious metals, namely palladium, platinum, ruthenium, osmium, gold and silver, and a process for their recovery from the resultant solution which contains them.

The precious metals are constantly present in the form of a mixture in the minerals which contain them, and are sometimes in the form of alloys from which they have to be separated and recovered.

In the method devised up to the present time for extracting and separating them, the mixture of precious metals is put into solution and the various metals are selectively precipitated with specific reagents.

All these methods are very complicated and special difficulties are encountered in separating the rhodium and iridium from the remaining precious metals. Furthermore the metal precipitation is never complete, and considerable quantities of precious metals remain in the effluent solutions, and cannot be further recovered except by recycling.

The introduction of a recycling stage in an obvious considerable burden on the process cycle and has the disadvantage of large capital investment to accommodate the precious metals temporarily untreated.

A new extremely simple process has now been found, and forms the object of the present invention, for separating rhodium and/or iridium practically totally from the other precious metals, and for recovering them totally from the final solution which contains them.

The new process may be applied to any solution, either aqueous or in an organic solvent, containing the precious metals in the form of salts or complexes of any type, at a metal ion concentration between 100 ppm and the maximum concentration compatible with the solubility of the precious metal compounds. Concentration between 1 and 10% are preferred.

Consequently the new process may be applied directly to a solution of noble metals obtained by treating minerals or alloys to immediately give a first separation into two groups (rhodium and iridium on the one hand and palladium, platinum, gold, silver, ruthenium and osmium on the other) which considerably simplifies the subsequent stages of the separation processes, or it may be applied to any point in the known separation methods for separating at that moment the rhodium and/or iridium practically totally from the remaining precious metals still present.

The new process may also be applied to industrial effluents of various types, which contain rhodium and/or iridium in mixture with one or more different precious metals for the purpose of totally and separately recovering them. The new process consists essentially of treating the solution containing the precious metals for a determined time with carbon monoxide in the presence of quantities by weight of water or primary or secondary alcohols equal to, or greater than the total quantity of precious metals present, and then filtering the heavy crystalline precipitate which separates.

It has in fact been found that although the carbon monoxide precipitates all the noble metals practically totally, the precipitation times are distinctly different for the various metals. More precisely, while Pt, Pd, Ru, Os, Au and Ag at total concentrations exceeding 100 ppm are precipitated totally in a maximum time of 10 hours, Rh and Ir require at least 10 - 20 hours for their total precipitation, and there is no appearance of these latter metals during the first precipitation stage. The separation is therefore complete and extremely simple.

The precipitation of the first group of noble metals with CO is preferably carried out at a pH between 0 and 4, at a temperature between 20° and 100° C and at a CO pressure between 1 and 20 atmospheres.

At pH values greater than 7, there is a certain precipitation of the metals in the form of oxides and hydroxides which react more slowly with the carbon monoxide.

The residual solution from the precipitation of Pt, Pd, Ru, Os, Au and Ag contains all the Rh and Ir initially present. The Rh and Ir may be recovered from this solution in the practically pure state by any known means, in particular by evaporating the water or organic solvent, by extracting the aqueous solution with a suitable organic solvent immiscible with water, or by precipitation with known precipitation reagents.

It is however very convenient economically to use the method of precipitation with CO according to the present invention.

In this case the residual solution is again treated with CO, preferably at a pH between 4 and 7, at a temperature between 50° and 100° C and at a CO pressure between 1 and 100 atm.

It is also preferable to avoid pH values greater than 7 in this case, to prevent formation of any oxides or hydroxides.

The reaction may be considered complete after a time between 10 and 40 hours, and the black microcrystalline precipitate formed is filtered.

When working in an aqueous solution, the precipitate containing the Rh and Ir may, as an alternative to filtration, be extracted with an organic, aromatic or chlorinated solvent, and recovered from this by evaporating the solvent. This alternative permits further purification of the Rh and Ir from any traces of the precious metals separated by the first precipitation and remaining in solution.

In all cases the precipitation of the metals by CO may be facilitated and accelerated by using normal techniques such as the introduction of germ crystals or substances of the filter aid type.

The reaction times used depend on the metals present, their concentration, and the maximum temperatures and pressures at which it is convenient to operate.

Because of the high density of the precipitates, it is easy to decant or filter them and wash them with water.

The metals obtained by the process according to the invention have a purity greater than 99%. The residual solution after separating the two metal fractions contains metal quantities less than 2 - 3 ppm, i.e. metal quantities absolutely negligible in all cases.

Summarizing, the advantages of the new process according to the invention compared with known separation processes are:

a. extreme simplicity and low cost of the process, b. total separation of the two groups of metals at very high purity, c. practically total recovery of the precious metals without the need for recycling, and d. ability to treat any type of solution containing the noble metals in any form.

The basis of the invention will be more evident from the illustrative examples given hereinafter, but which do not limit it in any way.

EXAMPLE 1

One liter of an aqueous solution containing 2.5% of platinum in the form of hexachloroplatinic acid and 0.1% of rhodium in the form of rhodium trichloride is brought to pH 2 with NaOH and saturated with carbon monoxide at atmospheric pressure and at 40° C.

After one hour the black crystalline product which separates is filtered, and is found on analysis to consist of platinum with a purity of 99.99%. The filtrate contains a quantity of platinum less than 2 ppm plus all the rhodium contained in the initial solution. This filtrate is brought to pH 6 with NaOH and saturated with CO at atmospheric pressure and at 60° C. After 10 hours the formed precipitate is filtered, and is extracted with one liter of benzene.

All the Rh in the form of a microcrystalline powder is recovered by evaporating the benzene.

The residual mother liquors have a Pt and Rh content less than 2 ppm.

EXAMPLE 2

One liter of an aqueous solution containing 6% of palladium in the form of palladium nitrate and 0.2% of rhodium in the form of rhodium trichloride is brought to pH 2 with NaOH and saturated with carbon monoxide at 5 atm and 70° C. The black crystalline precipitate which forms is filtered after 30 minutes. On analysis, the precipitate is found to contain 99.9% palladium, while the residual solution contains a quantity of palladium less than 3 ppm and all the rhodium initially present. This solution is brought to pH 6 with NaOH and saturated under atmospheric pressure at 60° C with CO. The precipitate formed is filtered after 10 hours and is extracted with 1 liter of chloroform.

All the Rh is recovered as a microcrystalline powder by evaporating the chloroform.

The mother liquors contain a quantity of Pd and Rh less than 2 ppm.

EXAMPLE 3

One liter of aqueous solution containing 2% of platinum in the form of hexachloroplatinic acid and 1% of iridium in the form of iridium trichloride is brought to pH 4 with NaOH and saturated with carbon monoxide at 5 atm and 50° C.

The black crystalline precipitate which forms is filtered after 1 hour and is found on analysis to consist of 99.99% platinum.

The residual mother liquors contain a quantity of platinum less than 2 ppm, while the iridium is present in the same quantity as in the initial solution. These liquors are brought to pH 6 and treated with CO at 5 atm and 70° C for 35 hours.

The suspension obtained is extracted with chloroform. All the Ir is obtained as a microcrystalline powder by evaporating the solvent.

EXAMPLE 4

One liter of aqueous solution containing 5% of ruthenium in the form of ruthenium chloride and 2% of rhodium in the form of rhodium nitrate is brought to pH 2 with $HNO_3$ and saturated with carbon dioxide at 1 atm and 50° C.

The black crystalline precipitate which forms is filtered after 4 hours and on analysis is found to contain 99.9% ruthenium.

The residual mother liquors contain less than 1 ppm of ruthenium and all the rhodium initially present.

These mother liquors are brought to pH 6 with NaOH and saturated with CO at atmospheric pressure and 60° C.

After 10 hours the suspension obtained is extracted with benzene, the benzene is evaporated and practically all the Rh initially present is obtained in the form of a microcrystalline powder.

EXAMPLE 5

One liter of a solution of Ru trichloride and Rh trichloride in isopropyl alcohol containing 1% of Ru and 0.1% of Rh is treated with CO at 1 atm and 50° C.

After 20 minutes the black crystalline precipitate which forms is filtered and on analysis is found to consist of Ru of 99% purity.

The filtrate contains less than 4 ppm of Ru and all the initial Rh. All the Rh present is recovered by evaporating the isopropyl alcohol.

I claim:

1. A process for separating and recovering rhodium and/or iridium from the other precious metals selected from the group consisting of palladium, platinum, ruthenium, osmium, gold and silver, wherein a solution having a pH between 0 and 4 and containing said precious metals in a total concentration of at least 100 ppm is contacted for a time between 15 minutes and 10 hours with carbon monoxide in the presence of a quantity of water or primary or secondary alcohol at least equal in weight to the total quantity of precious metals present at a temperature between 20° and 100° C and at a CO pressure between 1 and 20 atmospheres and thereafter the crystalline precipitate formed which contains all of the precious metals except rhodium and iridium is separated.

2. A process according to claim 1 wherein treatment is conducted in the presence of water.

3. A process according to claim 1 wherein treatment is conducted in the presence of a secondary alcohol.

4. A process for separating and recovering rhodium and/or iridium from the other precious metals selected from the group consisting of palladium, platinum, ruthenium, osmium, gold and silver, wherein a solution having a pH between 0 and 4 and containing the precious metals in a total concentration of at least 100 ppm is contacted for a time between 15 minutes and 10 hours with carbon monoxide in the presence of a quantity of water or primary or secondary alcohol at least equal in weight to the total quantity of precious metals present at a temperature between 20° and 100° C and at a CO pressure between 1 and 20 atmospheres and thereafter the crystalline precipitate formed which contains all of the precious metals except rhodium and iridium is separated, whereafter the solution containing the rhodium and iridium is further contacted with carbon monoxide for a time between 10 and 40 hours with carbon monoxide at a temperature between 50° and 100° C and at a CO pressure between 1 and 100 atmospheres and wherein the pH of the solution is between 4 and 7.

5. A process according to claim 4 wherein treatment is conducted in the presence of water.

6. A process according to claim 4 wherein treatment is conducted in the presence of a secondary alcohol.

* * * * *